Patented Aug. 19, 1952

2,607,700

UNITED STATES PATENT OFFICE 2,607,700

CONCRETE

Karl V. Vail, Los Angeles, Calif., assignor of one-fifth to Edward P. Vail and one-fifth to Robert G. Blanchard, both of Los Angeles, Calif.

No Drawing. Application December 10, 1948, Serial No. 64,715

5 Claims. (Cl. 106—97)

My invention relates to a concrete and to a method of rendering deleterious sands harmless, and has particular reference to a concrete mix having an additive thereto either in the form of a coarse aggregate, a fine aggregate, or as a substitute or additive to a cementing agent which counteracts the deleterious qualities of the coarse or fine aggregate used in combination in the concrete.

Concretes are composed of a mixture of coarse aggregate, fine aggregate and a cementing agent, the cementing agent usually being Portland cement. In view of the fact that the coarse and the fine aggregates are excessively heavy and bulky, economics demands that the closest available source of supply be used, the cost of transportation from more remote points being prohibitive.

Extensive tests have indicated that the quality of the aggregate varies considerably with the location from which it is mined.

The strength of a concrete structure is usually dependent upon the strength of the aggregate used and the extent to which all possible voids have been filled, together with the tenacity of the cementing agent. Hydraulic cements such as Portland cement upon setting are believed to form a crystalline structure which is highly tenacious to the surface of the aggregates, thereby effectively bonding the aggregates together to form a satisfactorily strong structure.

It has been noted over a period of time and by exhaustive laboratory tests that most aggregates contain deleterious substances which ultimately cause a degeneration of the concrete structure. The reason for such degeneration is not clearly known, but it is believed that the aggregates contain varying percentages of soluble silica which, in the presence of alkalies, will form silica jells which develop osmotic pressures up to approximately 550 lbs. per sq. in. It is, therefore, felt that the formation of the silica jells, which absorb water and expand, cause a weakening and degeneration of the concrete structure.

It is among the objects of my invention to provide a concrete aggregate using an additive which reduces the alkalinity of the Portland cement, thereby preventing formation of silica jells and thereby rendering otherwise deleterious aggregates innocuous.

It is possible in the laboratory and in closely controlled production to substantially reduce the alkaline content of Portland cement. It has, however, been found that the degree of control necessary is not warranted from a commercial or economic standpoint. I have found and have established by numerous laboratory tests, as will appear later from examples, that the addition of certain percentages of finely powdered altered anorthosite, that is, anorthosite from which all alkalies have been leached, will reduce the alkalinity of the Portland cement to a point where silica jells no longer form.

It is therefore, one of the objects of my invention to produce a Portland cement containing varying percentages of an alkaline reducing agent, such as altered anorthosite, depending upon the percentage of soluble silica contained in the aggregates, which will prevent the formation of silica jells in the final product.

I have also found that the formation of silica jells can be inhibited or prevented by the use of altered anorthosite as a substitute for, or additive to, the fine aggregates, such as sand, in the concrete mixture.

During the hydrolysis of Portland cement and the formation of the crystalline structure, considerable amounts of heat are generated. One very serious problem in large concrete structures, such as dams or piers, lies in the removal of heat being generated. It is apparent that the amount of heat generated is in direct proportion to the amount of cement used, and that if an equivalent strength can be obtained by the use of smaller amounts of cement, definite advantages are gained from the standpoint of removal of heat. I have found that by the substitution of finely ground altered anorthosite, which contains some calcium zeolite, for some of the cement, that a structure of equivalent strength can be produced with smaller amounts of cement, thereby avoiding the production of excessive heat.

Anorthosite is the name applied by T. Sterry Hunet to granitoid rocks that consist of little else than labradorite, which is primarily a lime-soda feldspar. It has a chemical composition of calcium, sodium, aluminium silicate, $mCaAl_2Si_2O_8$ with $nNa_2Al_2Si_2O_8$. It crystallizes in the triclinic series.

Altered anorthosite is anorthosite with substantially all of the alkali leached out.

Standard tests for compressive strength of concrete structures are usually made with a mortar bar and subjected to compressive loads at the end of seven and twenty-eight days, three months and up to four years. It has been found that concrete increases gradually in strength during these periods. However, it has also been found that at the end of the four-year period, the mortar bar, in the event that deleterious aggregates are used, will have increased in size. Such increase in size can present serious problems in construction work. In view of the fact that four-year waiting periods are impractical, if it is desired to test a given aggregate for a proposed structure, laboratory tests have shown that there is a direct ratio between the alkalinity and soluble silica in a concrete mix and the degree of swelling at the end of the four-year period. Soluble silica content and degree of alkalinity have been established as a means for predicting the amount of swelling of a concrete mix. It is, therefore, highly desirable and is one of the objects of my invention to produce a concrete mix, which is low in soluble silica and which results in a high degree of reduction of alkalinity. The low soluble silica can be obtained by using anorthosite as a coarse aggregate and/or altered anorthosite as the fine aggregate. Alkalinity can be greatly reduced by using a finely ground altered anorthosite as a substitute for, or additive to, the cement.

As an example, the following test was run, the purpose of the test being to determine the effect of finely ground anorthosite on compressive strength of cement-graded sand mortars. The method of testing was as follows: One part of cement was mixed with 2.75 parts graded sand plus finely ground anorthosite. Each of the mixes was tested for compressive strength on 2" x 2" cubes at the end of seven days, twenty-eight days and three months. The following results were observed:

| Mix, Number | 1 | 2A | 3A | 4A |
|---|---|---|---|---|
| Laboratory Numbers | 92383 | 92384 | 92385 | 92386 |
| Cement | 1.0 | 1.0 | 1.0 | 1.0 |
| Anorthosite | None | 0.22 | 0.41 | 0.69 |
| Ottawa Graded Sand | 2.75 | 2.53 | 2.34 | 2.06 |
| Flow, Percent | 109 | 110 | 109 | 110 |
| W/C Ratio by Weight | 0.494 | 0.520 | 0.547 | 0.587 |
| Compressive Strength (2" x 2" Cubes), Lbs. per sq. in.: | | | | |
| 7-day | 2,307 | 2,690 | 2,804 | 3,148 |
| 28-day | 3,858 | 4,556 | 3,528 | 4,060 |
| 3-month strength | 4,202 / 4,108 / 4,373 | 5,255 / 5,087 / 5,780 | 6,067 / 5,575 / 5,792 | 5,785 / 5,860 / 5,000 |
| Average of 3 | 4,228 | 5,375 | 5,811 | 5,548 |
| Percent of Standard | | 127 | 137 | 131 |

It will be noted that mix No.1 contained no anorthosite and was, therefore, used as a standard. It should also be noted that at the end of seven days, the standard mix was substantially equal to the other mixes containing anorthosite, and that each of the mixes increased in strength up to the end of the three-month test, but that those mixes containing anorthosite increased at a greater rate and ultimately reached a higher compressive strength.

A further test was run on substantially the same basis and resulted in the following comparisons:

| Mix Number | 1 | 2A | 3A | 4A |
|---|---|---|---|---|
| Lab No | 92383 | 92384 | 92385 | 92386 |
| Cement | 1.0 | 1.0 | 1.0 | 1.0 |
| Anorthosite | None | 0.22 | 0.41 | 0.69 |
| Ottawa Graded Sand | 2.75 | 2.53 | 2.34 | 2.06 |
| Flow, Percent | 109 | 110 | 109 | 110 |
| W/C Ratio by Weight | 0.494 | 0.520 | 0.547 | 0.587 |
| Compressive Strength (2" x 2" Cubes): | | | | |
| 7 days | 2,200 / 2,350 / 2,370 | 2,735 / 2,565 / 2,670 | 2,700 / 2,773 / 2,940 | 3,070 / 3,163 / 3,210 |
| 7-day average | 2,307 | 2,690 | 2,804 | 3,148 |
| Percent of Standard | 100 | 116 | 121 | 136 |
| 28-day | 3,997 / 3,745 / 3,732 | 4,250 / 4,930 / 4,487 | 3,802 / 3,267 / 3,515 | 4,610 / 3,760 / 3,810 |
| 28-day Average | 3,858 | 4,556 | 3,528 | 4,060 |
| Percent of Standard | 100 | 118 | 91 | 105 |
| 3-month strength due 7/27/48 | 4,228 | 5,374 | 5,811 | 5,548 |
| Percent of Standard | 100 | 127 | 137 | 131 |

It is of interest to note that mix No. 3A, which started at 121% of standard in compressive strength at the end of seven days had decreased to 91% of standard at the end of twenty-eight days, but had regained its original advantage and increased to 137% of standard at the end of the three-month period. The conclusion must be reached that whereas the standard mix, that is, containing no anorthosite, increased faster between seven and twenty-eight days tests, the mix 3A continued to increase at a much greater rate than was found in the case of the standard mix.

A test was run to determine the effect of substituting finely ground anorthosite for part of the cement. The mix consisted of 2.75 parts of graded Ottawa sand to one part cement plus anorthosite. The following results were observed:

| Mix Number | 1 | 2 | 3 | 4 | 5 | 6 | 7 |
|---|---|---|---|---|---|---|---|
| Laboratory Number | 92383 | 92701 | 92702 | 92703 | 93093 | 93094 | 92662 |
| Cement | 1.0 | 0.92 | 0.85 | 0.75 | 0.70 | 0.60 | 0.50 |
| Anorthosite | None | 0.08 | 0.15 | 0.25 | 0.30 | 0.40 | 0.50 |
| Ottawa Graded Sand | 2.75 | 2.75 | 2.75 | 2.75 | 2.75 | 2.75 | 2.75 |
| Flow Percent | 109 | 107 | 107 | 106 | 109 | 107 | 107 |
| W/C Ratio by Wt | 0.494 | 0.552 | 0.588 | 0.565 | 0.710 | 0.835 | 1.018 |
| Compressive Strength (2" x 2" Cubes), Lbs. per sq. in.: | | | | | | | |
| 7-day strength | 2,307 | 2,524 | 2,059 | 2,021 | 1,670 | 1,391 | 1,104 |
| 28-day strength | 3,858 | 5,027 | 4,060 | 2,963 | 2,759 | 2,274 | 1,779 |
| 3-mo. strength | 4,202 / 4,108 / 4,373 | 4,575 / 6,025 / 5,400 | 4,527 / 4,895 / 4,385 | 5,145 / 4,773 / 4,908 | 4,005 / 3,665 / 3,398 | 3,178 / 3,205 / 2,845 | 2,950 / 2,775 / 2,525 |
| Aver. of 3 | 4,228 | 5,333 | 4,602 | 4,942 | 3,689 | 3,076 | 2,750 |
| Percent of Standard | | 126 | 109 | 117 | 87 | 73 | 65 |

It is of particular and significant importance to note that at the end of the seven-day period, the standard mix was stronger than all of the mixes containing anorthosite with the exception of mix No. 2. However, at the end of twenty-eight days mix Nos. 2 and 3 were stronger than the standard, and at the end of three months mix Nos. 2, 3 and 4 had increased in strength beyond the standard mix. These tests seem to indicate and bear out the theory that in a standard mix the cement hydrolyizes rather rapidly and gradually loses part of the water of hydrolysis to the osmotic silica jells so that the initial strength is not increased as rapidly as desired, and that the addition of finely ground anorthosite to the cement inhibits the formation of silica jells, thereby allowing prolonged and greater increase in strength of the structure.

The above tests tend to establish that altered anorthosite and/or its resultant sand, when used as an additive or substitute in part for cement or fine aggregates in varying sizes and proportions, according to the modulus of fineness of the aggregate and the degree of deleterious reactivity of other aggregates used due to alkalies when in combination with cement and water to form concrete, will eliminate or reduce to a point of innocuousness the deleterious reactivity of those aggregates subject to reactivity when in combination with cement and water, thus assuring a permanently stable concrete free from failure and disintegration.

Such additive will also increase the strength of the concrete or maintain the strength of the concrete with less cement thus effecting a reduction in cement cost, a proportionate reduction in heat generation and expense in connection with control of concrete temperatures and a reduction in the number of contraction joints.

These characteristics are attributable to the chemical and physical composition in that it is comparatively free from alkalies which have been leached out. It embodies colloidal ferric and aluminum silicate and hydroxides of iron, copper and aluminum in the presence of calcium carbonate, making it an absorbent or adsorbent of the alkalies in the cement. It probably also contains some ilmenite with titanium dioxide in colloidal form.

The exact reason for the reaction of anorthosite or altered anorthosite in reducing alkalinity in a concrete mix and rendering the mix innocuous is not too clearly known. It is, however, felt that the reaction is similar to the reaction of the calcium zeolites, such as chabazite,

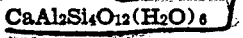
$CaAl_2Si_4O_{12}(H_2O)_6$ heulandite,
$CaAl_2Si_6O_{16}(H_2O)_5$ and stilbite,
$CaAl_2Si_6O_{16}(H_2O)_6$ which are believed to be present. It would, therefore, appear that the calcium zeolite by means of an ionic exchange with the alkalies renders the alkalies harmless and prevents the formation of deleterious silica jells, which cannot form in the absence of alkalies. The soluble silica, therefore, hydrolizes and acts as an additional cementing agent.

Having described my invention, what I claim as new and desire to secure by Letters Patent is:

1. A concrete mix comprising a coarse aggregate, a fine aggregate including anorthosite from which substantially all alkalies have been leached, and a hydraulic cement.

2. A concrete mix comprising a coarse aggregate, a fine aggregate and a hydraulic cement having finely ground anorthosite added thereto, said anorthosite having substantially all alkalies leached therefrom.

3. A concrete mix comprising a coarse aggregate, a fine aggregate and a cementing agent comprising from .92 to .50 parts by weight hydraulic cement and .08 to .50 parts by weight anorthosite from which substantially all alkalies have been leached.

4. A cementing agent comprising Portland cement and finely ground anorthosite from which substantially all alkalies have been leached.

5. A cementing agent comprising Portland cement and 8 to 50% by weight finely ground anorthosite from which substantially all alkalies have been leached.

KARL V. VAIL.

REFERENCES CITED

The following references are of record in the file of this patent:

UNITED STATES PATENTS

| Number | Name | Date |
|---|---|---|
| Re. 19,005 | Wilner | Nov. 21, 1933 |
| 1,317,525 | Romano | Sept. 30, 1919 |
| 1,406,421 | Senan | Feb. 14, 1922 |
| 1,696,899 | Baccovich | Jan. 1, 1929 |
| 1,865,732 | Wagner | July 5, 1932 |